UNITED STATES PATENT OFFICE.

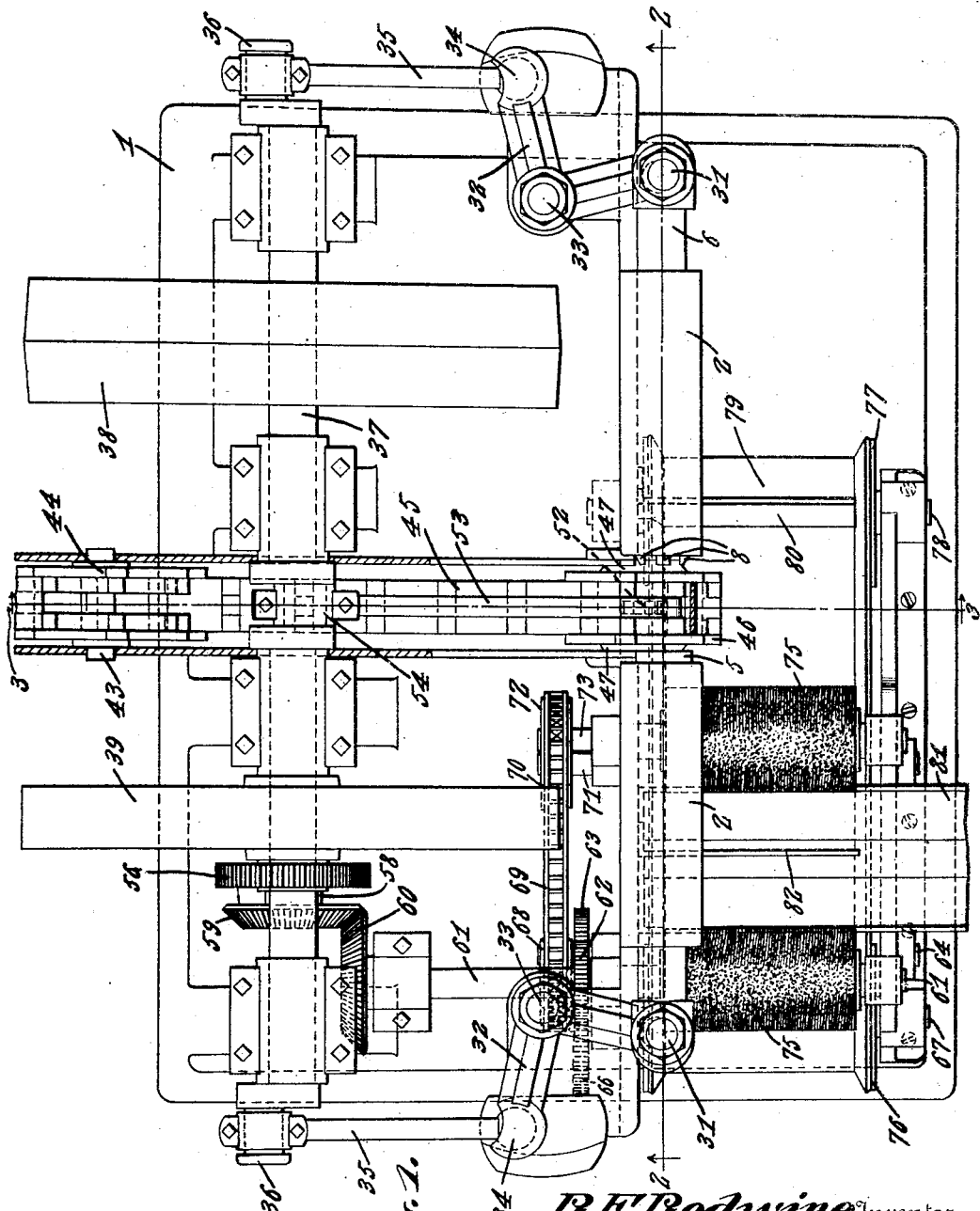

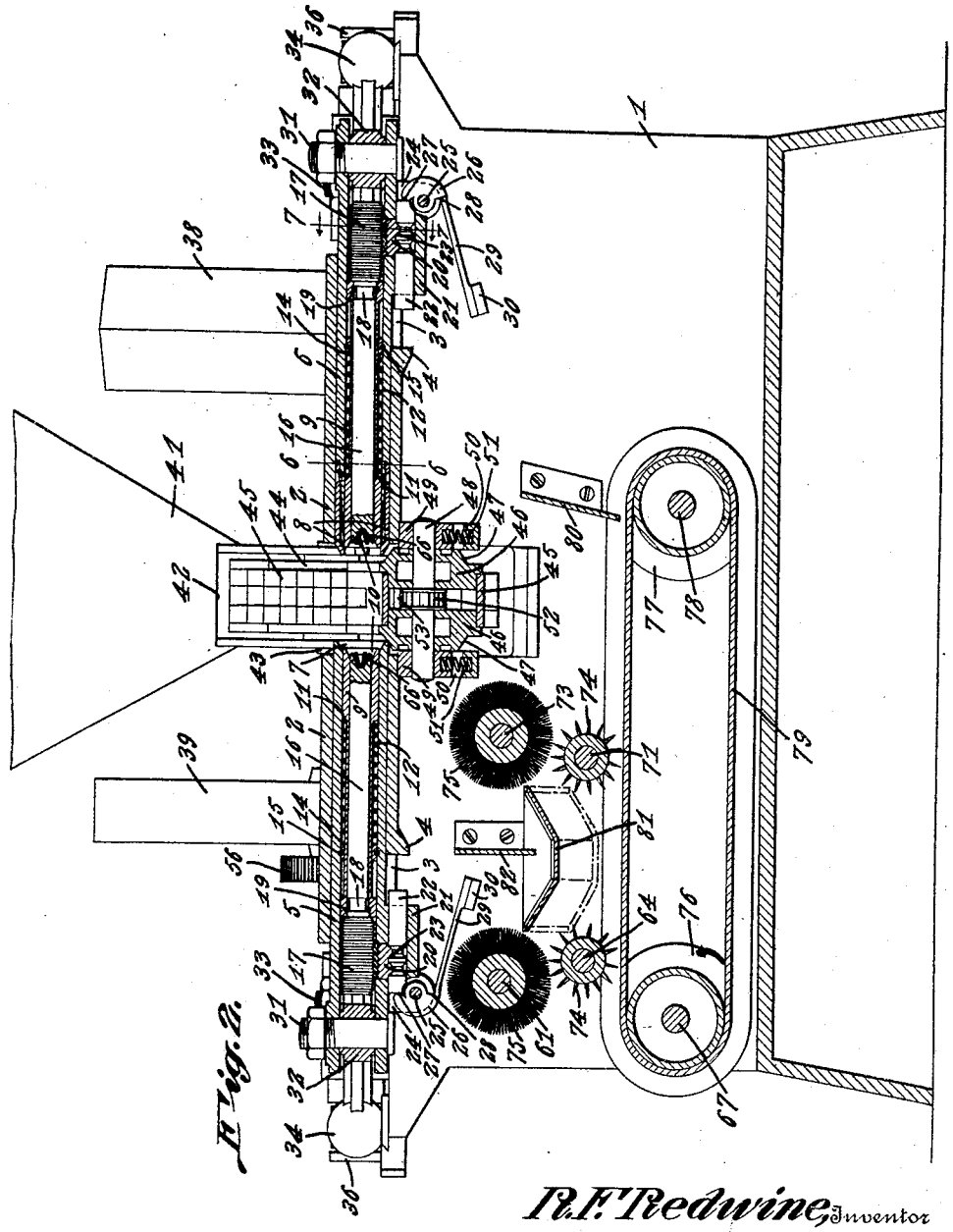

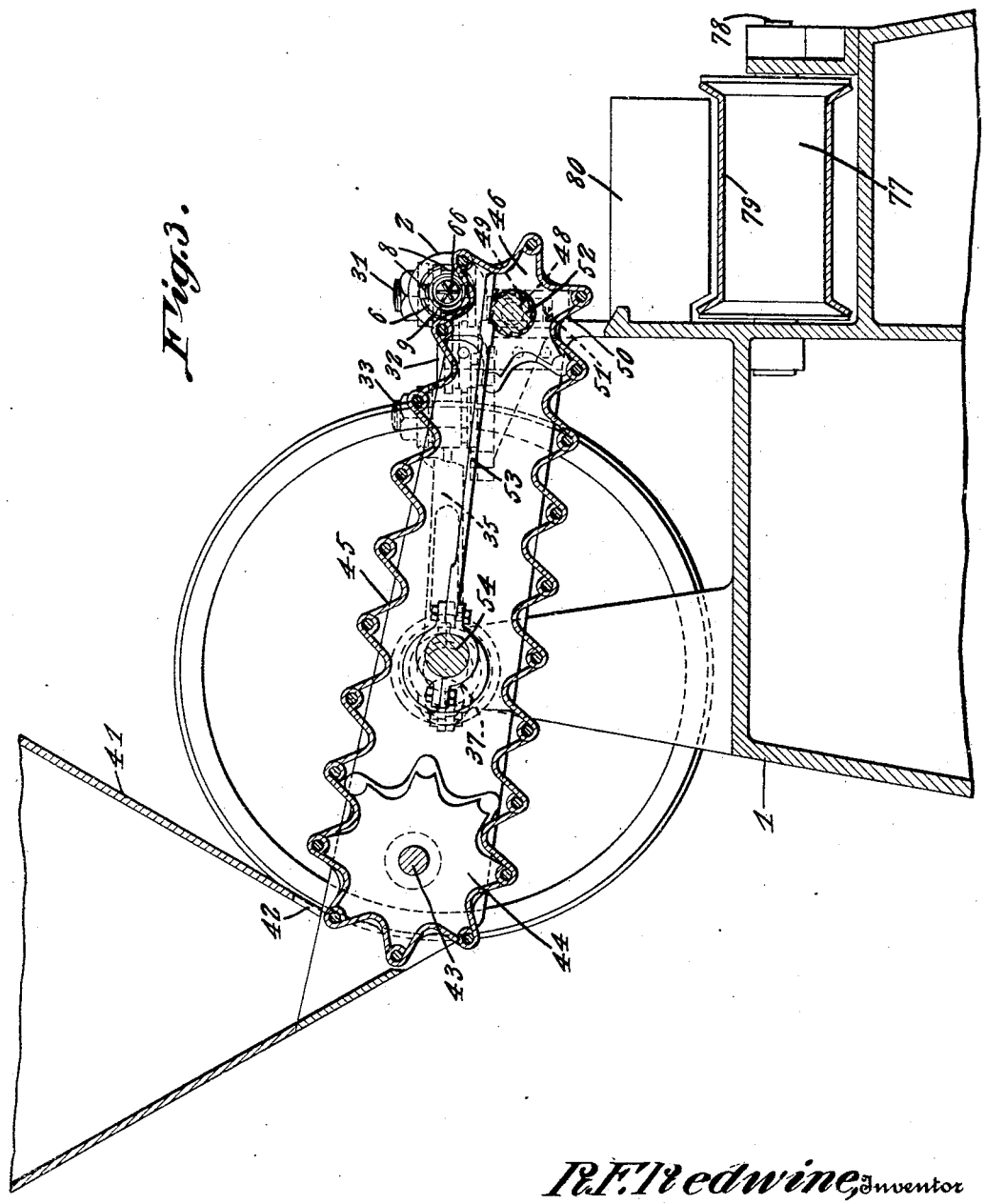

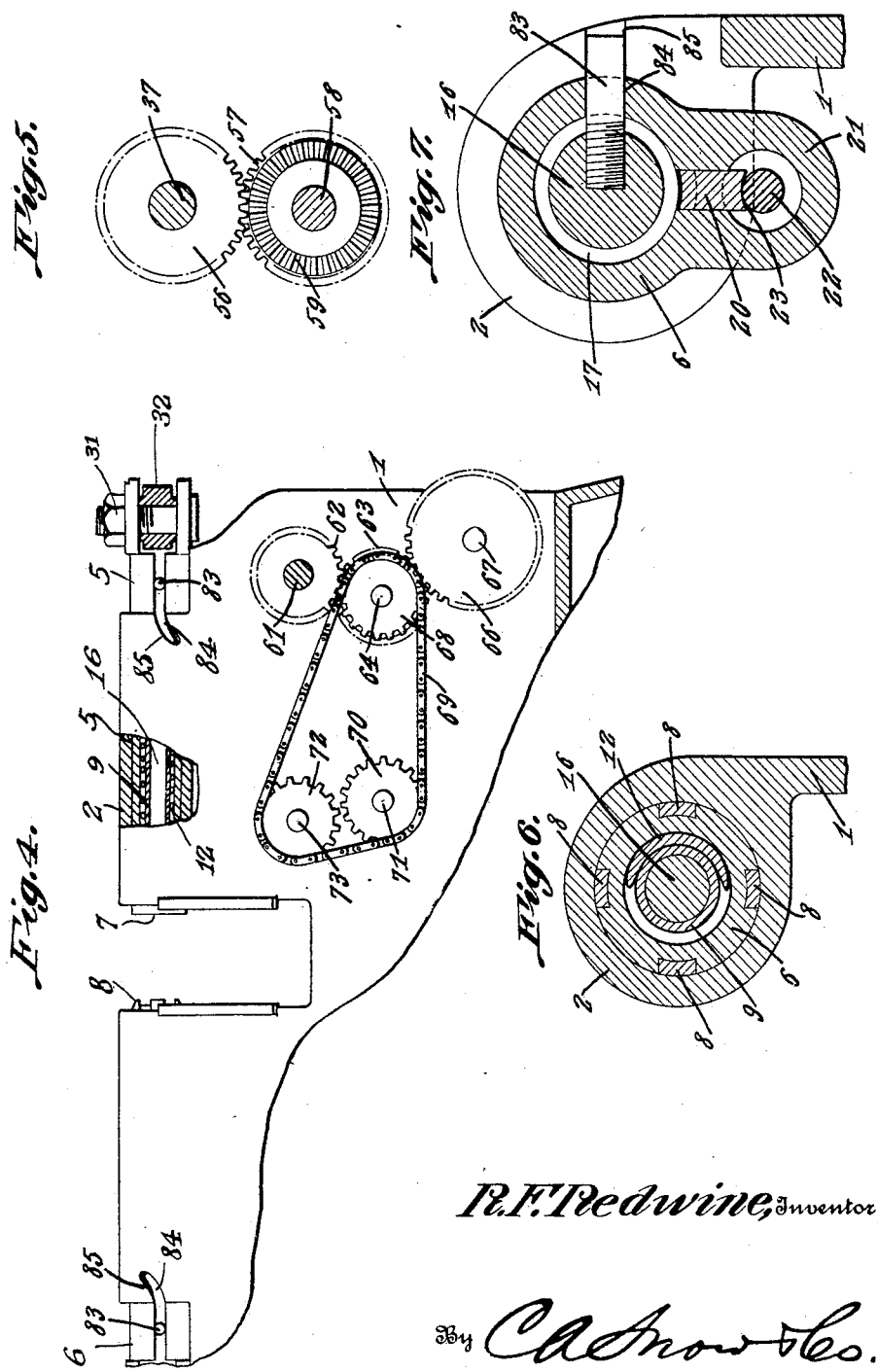

REX F. REDWINE, OF KERRVILLE, TEXAS.

NUT-HANDLING MACHINE.

1,410,122.  Specification of Letters Patent.  Patented Mar. 21, 1922.

Application filed November 12, 1920. Serial No. 423,617.

*To all whom it may concern:*

Be it known that I, REX F. REDWINE, a citizen of the United States, residing at Kerrville, in the county of Kerr and State of Texas, have invented a new and useful Nut-Handling Machine, of which the following is a specification.

The device forming the subject matter of this application is adapted to be employed for cracking nuts of various kinds such as pecans, and one object of the invention is to provide novel means for cracking the nut, the invention comprising, especially, means whereby a thrust is imparted to the ends of the nut, a circumferential pressure being applied to the nut, intermediate the ends of the nut, at the time that the endwise thrust approaches a maximum, the ends of the nut being twisted axially.

Another object of the invention is to provide novel means for separating the meats of the nuts from the shells thereof.

A further object of the invention is to provide novel means for actuating the various instrumentalities above alluded to.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown, can be made without departing from the spirit of the invention.

In the accompanying drawings:—

Figure 1 shows in top plan, a machine constructed in accordance with the invention, parts being broken away and parts appearing in section; Figure 2 is a vertical section taken on the line 2—2 of Figure 1; Figure 3 is a section taken on the line 3—3 of Figure 1, the hopper appearing as an added detail; Figure 4 is a fragmental rear elevation showing, particularly, certain of the driving trains; Figure 5 is a sectional view, diagrammatic in nature, and showing a portion of one of the gear trains; Figure 6 is a section taken on the line 6—6 of Figure 2; Figure 7 is a section taken on the line 7—7 of Figure 2.

In carrying out the present invention there is provided a frame 1 which may be constructed variously without jeopardizing the utility of the invention. The frame 1 carries axially alined tubular guides 2 having lower openings 3, there being abutments 4 at the inner ends of the openings, as shown best in Figure 2.

An outer sleeve 5 is mounted for longitudinal reciprocation in one of the guides 2, a similar sleeve 6 being mounted for reciprocation in the other of the guides. The sleeve 5 is provided at its inner end with a flared mouth 7. Spring arms 8 extend longitudinally of the outer sleeve 6 and are connected thereto, the spring arms constituting means for applying a circumferential pressure to the nut, as will be described hereinafter.

Tubular members 9 are slidable within the sleeves 5 and 6 and are supplied at their inner ends with conical bores 10. Each tubular member 9 has an external shoulder 11, against which abuts a compression spring 12, engaged by an abutment 14 held by an annular key 15 within the outer sleeve 5 or 6. Plungers 16 are located within the tubular members 9 and are supplied at their inner ends with ribbed seats 66. At its outer end, the plunger 16 has a head 17 equipped with annular ribs. A circumferential groove 18 is fashioned in the plunger 16 and a key 19, carried by the tubular member 9, has a limited movement in the groove 18.

Locking blocks 20 are mounted for vertical sliding movement in the sleeves 5 and 6, each sleeve having a longitudinally extended socket 21 in which a slide 22 is mounted for reciprocation. The slide 22 and the locking block 20 are provided with mutually inclined parts 23, the construction being such that when a longitudinal movement is imparted to the slide 22, the block 20 may be raised and lowered, the block, in this way, being moved into and out of locking engagement with the head 17 of the plunger 16. The sleeves 5 and 6 are supplied with depending hangers 24 carrying shafts 25 on which rockers 26 are mounted, each rocker having an upper shoulder 27 and a lower shoulder 28. Spring arms 29 are mounted as indicated at 30 on the frame 1, the spring arms being inclined, and the outer ends of the spring arms being disposed in the path of the shoulders 28 of the rockers 26.

The outer ends of the sleeves 5 and 6 carry pivot elements 31 which serve to connect the sleeves with bell cranks 32 fulcrumed at 33 on the frame 1, the bell cranks being united, by ball and socket joints 34, with pitmans 35, connected to cranks 36 at the ends of a shaft 37 journaled for rotation on the frame 1. Any suitable means, such as a drive wheel 38, may be employed for imparting rotation to the shaft 37, the shaft carrying a fly wheel 39.

A hopper 41 is supported on the frame 1 and has an opening 42. A shaft 43 is journaled on the frame 1 and carries sprocket wheels 44. The sprocket wheels 44 coact with a conveyor 45 carried by sprocket wheels 46 on a shaft 48, the sprocket wheels 46 having laterally inclined surfaces 47, shown in Figure 2. The shaft 48 is journaled in bearings 49 mounted to slide in guides 50 on the frame, the bearings 49 being supported yieldably by compression springs 51.

A ratchet wheel 52 is secured to the shaft 48 between the sprocket wheels 46 and cooperates with a feed pawl 53 connected to a crank 54 formed in the intermediate portions of the shaft 37.

The shaft 37 carries a gear wheel 56 meshing into a gear wheel 57 on a shaft 58 journaled in the frame 1. A beveled pinion 59 on the shaft 58 meshes into a beveled pinion 60 on a shaft 61 journaled in the frame. The shaft 61 carries a gear wheel 62 meshing into a gear wheel 63 carried by a shaft 64 journaled in the frame 1. The gear wheel 63 meshes into a gear wheel 66 on a shaft 67. There is a sprocket wheel 68 on the shaft 64, the sprocket wheel 68 being engaged with a sprocket chain 69 trained around a sprocket wheel 72 on a shaft 73 journaled in the frame, and around a sprocket wheel 70 carried by a shaft 71 mounted in the frame. The shaft 61 and the shaft 73 serve to rotate brushes 75, the shafts 64 and 71 being provided with picker rollers 74, the brushes 75 cooperating with the picker rollers 74. There is a drum 76 on the shaft 67, there being a drum 77 on an idle shaft 78 mounted in the frame 1. A belt conveyor 79 coacts with the drums 76 and 77. The belt conveyor 79 extends beneath the picker rollers 74 and is so located that it can receive the cracked nuts, as hereinafter set forth, the cracked nuts being directed onto the conveyor 79 by a guide plate 80 mounted on the frame. A chute or other conveyor 81 is so located as to receive the meats which are brushed off the picker rollers 74 by the members 75, a baffle plate 82 being carried by the frame 1, the baffle plate extending longitudinally of the chute 81.

The plungers 16 are provided with outstanding pins or projections 83, received in slots 84 in the outer sleeves 5 and 6 received in slots 85 in the frame, the inner ends of the slots being inclined in opposite directions, as shown in Figure 4.

When the parts are arranged as shown in Figure 2, the shoulder 28 of the rocker 26 is in contact with the spring arm 29, the slide 22 is so located that the locking block 20 has moved downwardly out of engagement with the head 17 of the plunger 16, and the spring 12 is compressed and ready to expand. The springs 12 expand and the tubular members 9 move forwardly, the conical bores 10 of the members 9 receiving the ends of a nut on the conveyor 45. The tubular members 9 may advance no more than the movement of the keys 19 in the grooves 18 of the plungers 16 will permit, but, if the nut is small, the plungers 16 may be carried forwardly with tubular members, since the blocks 20 are out of locking engagement with the plungers 16. The ends of the nut are received in the ribbed seats 66 of the plungers 16, and, as the outer sleeves 5 move forwardly, the members 9 and the plungers 16 are carried forwardly, and the springs 12 are compressed. A slight backward movement of the tubular members 9 and the plungers 16 is possible, when these parts begin to be carried forwardly by the sleeves 5, and in this way, the machine adjusts itself to the length of the nut, measured from end to end. Shortly after the aforesaid adjustment to the nut has been brought about, the shoulders 28 of the rockers 26 cooperate with the ends of the tongues 29 to rotate the rockers, so that the shoulders 27 of the rockers advance the slides 22. When the slides 22 are advanced, the mutually inclined parts 23 of the slides and of the blocks 20 coact to raise the blocks and to cause the blocks to engage the heads of the plungers 16. The sleeves 5, the tubular members 9 and the plungers 16 now advance together and pressure is applied to the ends of the nut. At the time that the endwise pressure on the nut is at a maximum, the ends of the spring arms 8 on the sleeve 6 cooperate with the flared mouth 7 of the sleeve 5, and the free ends of the spring arms are forced inwardly, thus applying a circumferential pressure to the nut. As the plungers 16 and the members 9 approach the end of the inward stroke, the projections 81 on the plungers move into the inclined ends of the slots 85 in the frame 2, and, owing to the inclination of the ends of the slots, the plungers 16 are rotated in opposite directions, through an arc of thirty degrees more or less.

From the foregoing it will be obvious that the nut is subjected to stress in three ways. An end pressure or thrust is applied to the nut; a circumferential pressure is applied to the nut, and a twist is applied to the nut.

When the outer sleeves 5 and 6 have arrived at the end of the forward stroke, the slides 22 engage the abutments 4, the slides being carried to the left (see Figure 2). In this connection, it should be noted that the slides are carried to the left, not merely into the position shown in Figure 2, but beyond that position, so that the blocks 20 are held in interengaged relation to the heads 17 of the plungers 16. The springs 12 have been compressed, by the thrust against the ends of the nut, and the springs are held under compression, during the backward or outward stroke, to the left, in Figure 2. The shoulders 28 of the rockers 26 engage again with the outer ends of the spring tongues 29. The first action of the spring tongues 29 is to rotate with the rockers 26 slightly, so that the slides 22 are advanced, into the position shown in Figure 2, the blocks 20 moving downwardly into the unlocked position shown in Figure 2. Subsequently, as hereinbefore set forth, the tongues 29 impart a continued rotation to the rockers 26, and, after an interval sufficient to permit the tubular members 9 to advance toward the nut, under the action of the springs 12, the locks 20 are raised, as hereinbefore described.

It is to be observed that one end of the conveyor 45 is yieldably supported, since the shaft 48 which carries one end of the conveyor 45 is journaled in bearings 49, carried by the springs 51. When the outer sleeves 5—6 are advanced, the ends of the sleeves engage the inclined surfaces 47 of the sprocket wheels 46 which carry the conveyor 45 and force the sprocket wheels, along with conveyor, downwardly, this operation permitting the sleeves 5 and parts carried thereby to approach each other sufficiently so that the nut will be cracked and broken.

The nut, having been broken, drops downwardly, and is directed by the guide plate 80 on the belt conveyor 79. The belt conveyor 79 advances the broken or cracked nut to the left, in Figure 2, and, ultimately, the fragments of the nut come into the field of operation of the picker rollers 74. The meats of the nuts are caught up by the picker rollers, the shells travelling to the left, out of the machine, on the belt conveyor 79. The brushes 75 remove the meats from the picker rollers 74 and deposit the meats in the chute 81, or upon any other suitable device located at the point indicated, the meats being carried out of the machine. The function of the baffle 82 is to prevent the brushes 75 from throwing the meats across the conveyor or chute 81 and out of the chute, transversely.

The general operation of the machine having been set forth, the driving trains will now be traced out.

Rotation is imparted to the shaft 37 by the drive wheel 38 or its equivalent. The crank 54 on the shaft actuates the feed pawl 53, the feed pawl coacting with the ratchet wheel 52, rotation being imparted to the shaft 48 and the sprocket wheels 46. The sprocket wheels 46, together with the sprocket wheels 44, carry the conveyor 45. As indicated in Figure 3, the conveyor 45 receives the nuts from the hopper 41, through the opening 42 and transfers the nuts into the field of operation of the cracking mechanism shown in Figure 2.

When the shaft 37 is rotated, the cranks 36 and the pitmans 35 swing the bell crank levers 32 on their fulcra 33, reciprocating movement being imparted to the sleeves 5 and attendant parts, by way of the pivot elements 31.

From the shaft 37, motion is transmitted by way of the gear wheel 56 to the gear wheel 57 and the shaft 58, the shaft 58 driving the shaft 61 by way of the beveled pinions 59 and 60. When the shaft 61 is rotated, rotation is imparted to the shaft 64 by way of the gear wheel 63 motion is transmitted to the shaft 67 through the gear wheel 66. The sprocket wheel 68 on the shaft 64 actuates the sprocket chain 69, the sprocket chain 69 driving the shaft 73 (see Figure 4) by way of the sprocket wheel 72 and driving the shaft 71 by way of the sprocket wheel 70. The shaft 61 carries one brush 75, the shaft 73 carries the other brush 75, the shafts 64 and 71 operate the picker rollers 74, and the shaft 67 drives the drum 76 and the belt conveyor 79.

Having thus described the invention, what is claimed is:

1. A nut cracker comprising means for imparting endwise thrust to a nut; yieldable means for applying circumferential pressure to the nut whilst the nut is subjected to thrust; and means for imparting a twist to the nut whilst the nut is subjected to thrust.

2. A nut cracker comprising means for imparting an end thrust to a nut; means for applying circumferential pressure to the nut whilst the nut is subjected to thrust; and means for rotating the ends of the nut in opposite directions whilst the nut is subjected to thrust.

3. A nut cracker comprising means for twisting the ends of a nut in opposite directions; and means for imparting a circumferential pressure to the nut.

4. A nut cracker comprising longitudinally movable members; spring means for advancing said members to select a nut; mechanism for advancing said members to impart an end thrust to the nut after the nut has been selected by the action of said spring means; and means for imparting a twist in opposite directions to the ends of the nut.

5. A nut cracker comprising longitudinally movable parts having coacting means, movable with respect to said parts, for imparting a circumferential pressure to a nut; members slidable on said parts; spring means for advancing said members to select a nut; plungers rotatable in said members; means for rotating the plungers to impart a twist in opposite directions to the ends of a nut after the nut has been selected by the action of said spring means; and mechanism for advancing and retracting all of the aforesaid elements which respect to each other.

6. A nut cracker comprising a conveyor; means for mounting the conveyor for radial swinging movement; means for supporting the conveyor yieldably; and nut cracking elements mounted for reciprocation toward and away from each other in a direction substantially at right angles to the plane in which the conveyor swings, the nut cracking elements and the conveyor having mutually inclined parts which coact to move the conveyor out of the path of said elements when said elements approach each other.

7. A nut cracker comprising members having means for engaging the ends of a nut; means for mounting said members for sliding movement to impart an end thrust to a nut, and for rotation in opposite directions, to apply a twist to a nut at each end thereof; mechanism for imparting sliding movement to said members; and means for rotating said members in opposite directions.

In testimony that I claim the foregoing as my own, I have hereto affixed my signature in the presence of two witnesses.

REX F. REDWINE.

Witnesses:
J. W. DICKENS,
W. O. STUBBLEFIELD.